United States Patent [19]

Jacobsen

[11] Patent Number: 4,942,903
[45] Date of Patent: Jul. 24, 1990

[54] FIRE AND CORROSION PROTECTED HOSE

[75] Inventor: Clas T. Jacobsen, Drammen, Norway

[73] Assignee: EB Norsk Kabel a.s, Drammen, Norway

[21] Appl. No.: 246,663

[22] PCT Filed: Jan. 5, 1988

[86] PCT No.: PCT/NO88/00001
  § 371 Date: Sep. 8, 1988
  § 102(e) Date: Sep. 8, 1988

[87] PCT Pub. No.: WO88/05885
  PCT Pub. Date: Aug. 11, 1988

[30] Foreign Application Priority Data

Jan. 29, 1987 [NO] Norway .................................. 870382
Mar. 25, 1987 [NO] Norway .................................. 871253

[51] Int. Cl.⁵ .......................... F16L 35/00; F16L 58/00
[52] U.S. Cl. ...................................... 138/110; 138/103;
  138/126; 138/137; 138/149; 428/921
[58] Field of Search ............... 138/149, 137, 110, 121,
  138/126, 177, 178, 103; 428/920, 921; 174/121 A

[56] References Cited

U.S. PATENT DOCUMENTS

| | | | |
|---|---|---|---|
| 3,530,899 | 9/1970 | Breeding | 138/149 |
| 3,861,425 | 1/1975 | Clark | 138/149 |
| 3,891,009 | 6/1975 | Noda et al. | 138/149 |
| 3,911,962 | 10/1975 | Chomat et al. | 138/137 |
| 4,025,680 | 5/1977 | Botsolas et al. | 138/149 |
| 4,275,769 | 6/1981 | Cooke | 138/126 |
| 4,276,332 | 6/1981 | Castle | 138/149 |
| 4,397,338 | 8/1983 | Cunningham | 138/149 |
| 4,404,992 | 9/1983 | Sasaki et al. | 138/149 |
| 4,450,872 | 5/1984 | Orcutt | 138/149 |
| 4,509,559 | 4/1985 | Cheetham et al. | 138/121 |
| 4,543,281 | 9/1985 | Pedersen et al. | 138/148 |
| 4,675,221 | 6/1987 | Lalikos et al. | 138/110 |
| 4,788,090 | 11/1988 | Marks et al. | 138/149 |

Primary Examiner—James E. Bryant, III
Attorney, Agent, or Firm—Burgess, Ryan, & Wayne

[57] ABSTRACT

In connection with installations comprising articles housing or conducting corroding material, or in connection with substantially pipe- or hose-shaped articles which are to be protected against fire, for example a propulsion motor in a vehicle, it is in accordance with the present invention suggested, rather than using steel pipes and/or steel containers, to use plastic articles which by nature is corrosion resistant. Plastic articles which preferably are pipeshaped (1) are insulated by means of a combination of a light thermally insulating material (2) which normally cannot stand exposure to fire (approximately 800° C. and higher), and a fire resistant material (3) which is provided around said insulating material (2), and which at high temperature (approximately 800° C. and higher) renders a ceramic stable fire protecting phase. Since the first layer of insulation has relatively low heat conductivity at lower temperatures, the outer layer will rapidly be brought up to the higher temperature range for the forming of a ceramic stable phase before the inner pipe or inner hose (31) is damaged by fire. Possibly, the first layer of insulation (33a) might be constituted by a foamed plastic/ceramic composition of substantially the same basic structure as the second layer (33) of the fire resistant material.

17 Claims, 3 Drawing Sheets

FIRE AND CORROSION PROTECTED HOSE

FIELD OF THE INVENTION

The present invention relates to a method for providing fire and corrosion protected objects, preferably pipe and/or pipe systems.

Further, the present invention relates to a method for providing substantially pipe- or hose-shaped fire protected objects, preferably a conduit for carrying fuel from a source to a use apparatus, for example a propulsion motor in a vessel, or especially a motor vehicle.

The invention also relates to fire and corrosion protected objects, as well as substantially pipe- or hose-shaped protected objects.

PRIOR ART

In connection with industrial process plants, for example chemical plants or oil refineries, etc., it is usual that steel pipes are used for the transmission of the raw material which is to be treated, and the materials included in the treatment. Steel pipes are used due to their resistance against heat and fire. The liquids and/or gasses passing through the pipes are however often corrosion promoting, and will therefore subject the steel pipes to heavy corrosion. In connection with oil refineries for refining offshore oil which is often mixed with salt water and other impurities, the pipes are subjected to severe corrosion. This implies that the frequency of maintenance is high, which in turn requires that the operations be stopped for control and maintenance. Consequently, the corrosion problem involves losses in productivity, and also represents a danger of leakage and plant failure.

Further, in connection with propulsion motors in vessels, and motor vehicles, it is of greatest importance that the conduit carrying fuel from the gasoline tank to the motor, be well protected against fire, such that the gasoline supply system remains a protected system as long as possible after the occurence of a fire on the vessel or in the vehicle.

A requirement to be met by the gasoline pipe or the gasoline hose which is to be mounted between the gasoline tank and the gasoline intake of the motor of a car, is that the conduit itself should be bendable or flexible, so that it can easily be mounted along the framework of the vehicle, said conduit also being so effectivly insulated agains fire that the driver and passengers will have time to leave the car in case of fire.

Within the car industry there are certain specifications concerning the length of time a gasoline pipe should resist a fire. The period of time varies depending on the classification of the vehicle. For example, it is a question of 90 seconds in connection with certain types of vehicles and certain types of fire apparatus, whereas for other vehicles the period of time can be approximately five minutes.

DISCUSSION OF THE INVENTION

An object of the present invention is to provide fire and corrosion protected articles, preferably pipes and/or pipe systems which meet the specifications for steel pipes as regards corrosion resistance and heat resistance, said articles according to the present invention being produced from inexpensive material, permitting installation in the form of pre-fabricated elements, and permitting simplified control and maintenance of the installed articles.

A further object of the present invention is to provide pipe- or hose-shaped fire protected articles, which are useful to supply fuel from a source to a consumption apparatus, for example a propulsion motor on a vessel, which resists high temperatures and the effect of flames in case of fire in the motor or the vessel. The fire protected article should also be flexible, or at least bendable for mounting without bending the conduit with special tools. Further, the article is manufactured from relatively inexpensive materials, for example in running lengths which are delivered in finished fire protected condition to the place of installation.

These objects are achieved in a method which according to the invention comprises an inner pipe of plastic, for example a polymer, a light, thermally insulating material which normally does not stand exposure to fire covers the inner pipe, and around the light, thermally insulating material there is provided a fire resistant material which at high temperature provides a ceramic stable fire protecting phase.

More especially, the objects of the invention are achieved by a method which is characterized in that around a substantially bendable plastic pipe there is applied a first layer of insulation having a relatively low heat conductance in a lower temperature range (approximately 100°–300° C.), and that around the first layer of insulation there is applied a second layer of a fire resistant material which at higher temperatures (approximately 300°–900° C.) provides a fire protecting effect.

Thus, within the process industry a corrosion resistant plastic can be used as a starting point, more specifically a polymer, for example glass fiber reinforced epoxy or polyester. Even if such plastic materials are corrosion resistant, they have no protection against high temperatures which develop during a fire, especially in connection with hydrocarbon fires, wherein the temperature can reach 1500° C. or more.

In most chemical plants there exists a requirement that the temperature in the interface between the article to be insulated and the insulation itself, shall not exceed a certain level when the insulated article is subjected to fire over a certain period of time. Surprisingly, it has been discovered that this interface temperature can be kept below the critical value if said inner pipe of plastic in the first instance is insulated by means of a light, thermally insulating material, for example glass wool, ceramic fibers or mineral wool, which normally does not stand the exposure of fire, i.e. a temperature which is higher than approximately 800° C., and this light, thermally insulating material is covered with a skin of a fire resistant material which at temperatures higher than 800° C. provides a ceramic stable and fire protecting phase.

For example mineral wool has good fire protecting properties up to 400° C., whereas in the range between 400° C. and 800° C. it loses its fire protecting property, since the binding material between the mineral fibers is destroyed and the mineral wool loses its original filament structure. In the present invention, the mineral wool is surrounded by a skin of a fire resistant thermo plastic ceramic material which will, at temperatures higher than 800° C., for example in the temperature range 1100°–1200° C. convert to a ceramic stable fire protecting phase contributing to keeping the mineral wool in a temperture range wherein the mineral wool retains its heat insulating properties.

In a further embodiment of the invention, the fire retardent insulation of the inner pipe a further layer of said fire resistant material may be provided between the light, thermally insulating material and said pipe.

In addition, there may be provided an outermost layer of a metal foil as a radiation screen, a layer of glass fiber tape, steel wire or a sealing and chemical resistant layer of foil or varnish.

Preferably, the fire resistant material may be provided in the form of tape, which is applied in the pre-fabrication of fire-insulated pipe lengths. In connection with pipe installations such pre-fabricated fire insulated pipe-lengths may be brought direct to the place of installation for the mounting. For the protection of pipe flanges, T-pieces, pipe bends, etc. there may preferably be provided moulded or extruded elements of the fire resistant material, said elements being provided as shells which are lined with an appropriate light weight insulation. These lined shells including fire resistant material in the form of tape can, both as regards the pre-fabrication and the keeping together of the shell-shaped insulation parts, be sealed by means of heat, for example a hot air stream.

It is to be understood that the fire and corrosion protected articles not only may comprise pipe-shaped articles or pipe systems as such, but can also comprise containers, walls, plates, etc., all having regard to the field of application in which the articles are to be protected against fire and corrosion.

Especially in connection with fire protection of bendable pipes the first layer of insulation comprises, for example glass fiber implemented as tape or woven material, whereas the second layer of insulation may comprise a fire resistant material which at higher temperatures forms a ceramic stable fire protecting phase.

The combination of an inner layer of insulation which prevents the intrusion of heat to the inner pipe during the first phase of a fire, i.e. when the temperature is in the range of approximately 100°-300° C., the outermost layer will more rapidly reach the higher temperature at which it is converted from a thermally conducting mass, to its expanding phase and finally to the phase wherein it develops a ceramic stable fire protecting material.

Rather than using an inner layer of glass wool or glass fiber, there may be used a foamed thermally insulating material which at higher temperatures forms a fire resistant effect, the second layer of insulation at the same time comprising a non-foamed layer of fire resistant material which at higher temperatures forms a stable ceramic fire protecting phase.

The combination of foamed and non-foamed fire resistant material, achieves a combination in which the foamed inner layer comprises a relatively good heat barrier in the lower temperature range, i.e. in the range of approximately 100°-300° C., such that the outer layer will rapidly be heated to higher temperatures, i.e. approximately 300°-900° C. and higher, to thereby more rapidly be converted to its cell-shaped ceramic structure forming an especially good fire protecting cover.

The foaming of the inner insulation layer may for example be such that this material achieves a density of approximately 1.0, whereas the non-foamed outer layer can have a density of approximately 1.5. It is to be understood that these values may be altered within wide limits, both individually and mutually.

Appropriately, a combination of insulating material, comprising an inner layer of glass fiber, an intermediate layer of foamed fire resistant material, and an outer layer of fire resistant material which at temperatures higher than about 800°-900° C. forms a stable ceramic fire protecting phase, together with the foamed intermediate layer.

The foamed material may comprise glass fibers, the contents of glass fibers and foaming agents being varied within wide limits.

If such a conduit for fuel is mounted within a stiff shell, it is appropriate that between the layers of insulation and the stiff shell to provide a layer of woven glass fiber and fabrics which can burn away under the influence of high temperature, the fabrice at the same time allowing for the swelling of the insulating material to twice its volume during a fire. The insulating material may then reach its fully foamed ceramic condition without changing the physical outer dimensions of the encapsulated pipe.

Thus, fire protected articles according to the present invention will comprise features as disclosed above, and as appearing from the further appended patent claims.

SHORT DESCRIPTION OF THE DRAWINGS

In the following the invention will be further described, with reference to the drawings illustrating embodiments of the invention.

DESCRIPTION OF EMBODIMENTS

Figure 1:
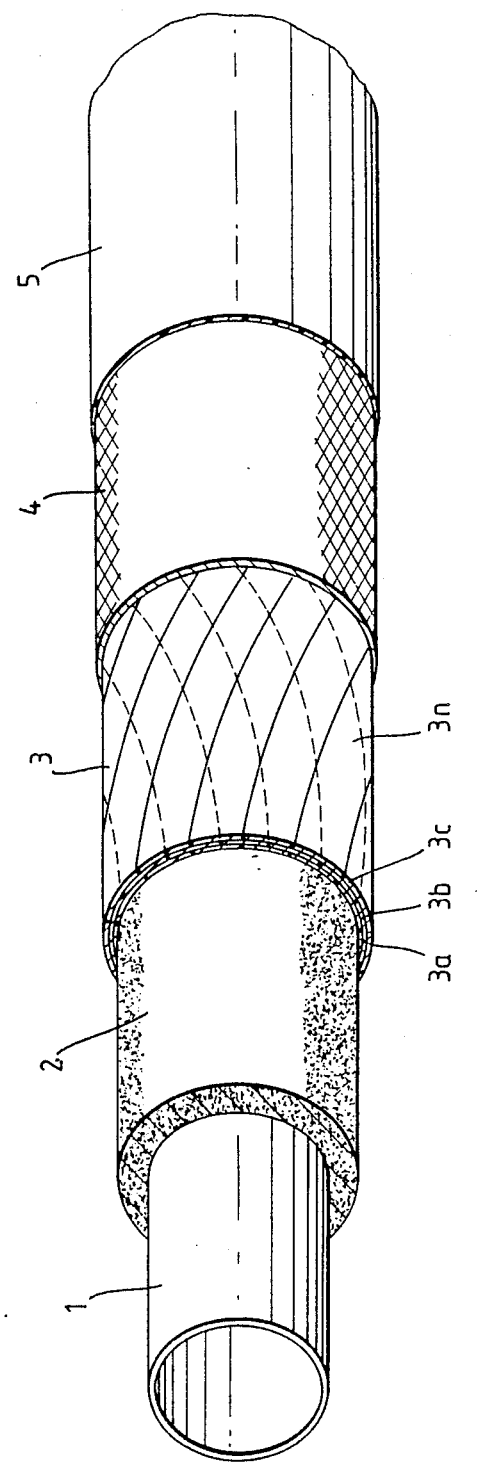
FIG. 1 is a perspective view of a pipe-shaped article which is insulated in accordance with a first embodiment of the invention.

In FIG. 1 reference numeral 1 designates an inner pipe of corrosion resistant material, for example a polymer plastic. More specifically the pipe may be manufactured from a glass fiber reinforced epoxy or polyester.

Around the pipe 1 there is provided a layer of light, thermally insulating material which normally does not stand the exposure to fire, for example glass wool, ceramic fiber or mineral wool. In the illustrated embodiment the layer of insulating material 2 may be mineral wool, applied to the pipe 1 in the form of semi-circular-shaped elements having approximately the same inner diameter as the outer diameter of the pipe.

Outside the insulating layer of mineral wool 2 there is providet a fire resistant material 3, said material being applied in three layers 3a, 3b, 3c, respectively. The application in layers of the fire resistant material 3 may preferably be realized by a wrapping of the fire resistant material in the form of tape, the tape-shape being illustrated by reference numeral 3n in FIG. 1.

Outside the fire resistant material 3 there is provided a glass fiber tape 4 and outside the latter there is provided a layer of epoxy 5.

Figure 2:
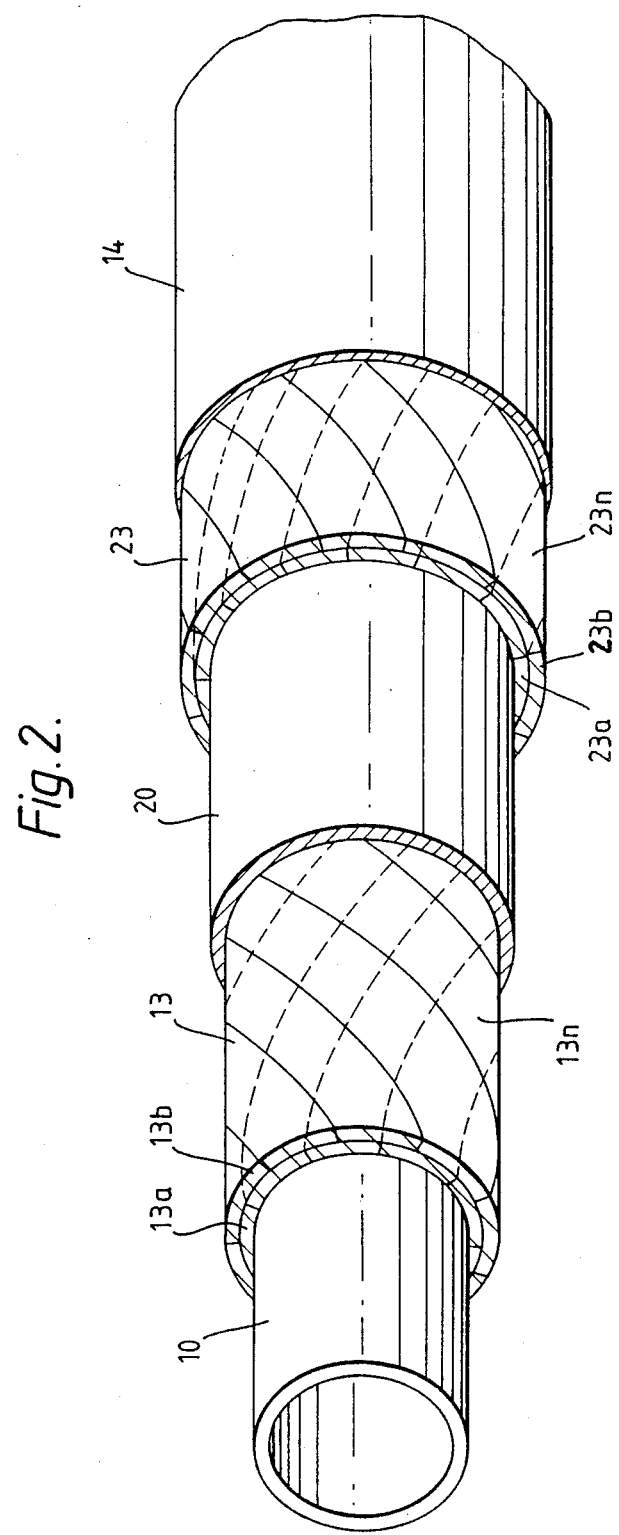
FIG. 2 is a perspective view of a pipe-shaped article which is insulated in accordance with a second embodiment of the invention.

In connection with the embodiment illustrated in FIG. 2, the plastic pipe 10 is covered directly with a fire resistant material 13, said material being applied in two layers, here 13a and 13b, preferably in the form a tape 13n. Outside the fire resistant material 13 there is provided a needle mat 20 which in turn is surrounded by an outer layer of fire resistant material 23, here in the shape of two layers 23a and 23b applied in the form of tape 23n. Outside the layers 23a and 23b of fire resistant material there is provided a glass fiber tape 14.

In general the embodiment according to FIG. 2 differs from the embodiment according to FIG. 1 only by comprising a further inner layer of fire resistant material. Possibly, the discussed embodiments may include an aluminium foil as a radiation screen, possibly a steel net, depending on the existing circumstances at the place of installation.

The advantages of the discussed embodiments for combined fire and corrosion protected pipe parts can be summarized as follows:

1. There can be used inexpensive, light, thermal insulating inner materials, for example glass wool, ceramic fibers or mineral wool, which normally do not resist exposure to fire at higher temperatures, or which lose their heat insulating properties at higher temperatures. Higher temperatures are to be understood as 800° C. and higher, as for example in connection with hydrocarbon fires. In combination with a fire resistant material which at temperatures higher than approximately 800° C. renders a ceramic stable and fire protecting phase, this combination will in case of fire render a temperature which in the interphase between the fire resistant material and the light, thermally insulating material will not exceed values rendering the light, thermally insulating material ineffective as heat insulator. In its ceramic phase the fire resistant material can protect the elements accommodated inside thereof at temperatures above 1500° C.

2. The fire resistant material comprises an effective heat insulator during the phase transitions, i.e. from being an approximately plastic material at temperatures below 200° C., to become a porous, thermally insulating material at temperatures above 200° C., and to a ceramic-like material at temperatures of approximately 1200° C. and higher. The insulation can in connection with the fire resistant material be made substantially thinner than in connection with alternative methods.

3. Said combination becomes mechanically very strong both in relation to damages during normal conditions of operation and in case of explosions.

4. The use of the fire resistant material in the form of tape makes it simpler to pre-fabricate fire insulated corrosion resistant pipes, and the repair of possible damages can easily be carried out on site.

5. For the protection of flanges, T-pieces, pipe bends, etc. in connection with a pipe conduit installation, there may be used pre-fabricated moulded pipe elements of the fire resistant material, which comprise a fire protecting shell lined with appropriate light weight insulation.

6. In the embodiment wherein the protected pipe comprises an inner layer of fire resistant material, the endothermic heat capacity of the material is utilized in a very favourable manner in case of fire. The inner layer can, as long as the endothermic reaction persists, be stabilized thermally at activation temperature for hydrates constituting a component of the fire resistant material.

Appropriately, the fire resistant material comprises 60–100 parts of weight of a thermoplast, 50–450 parts of weight of aluminum hydroxide and 150–600 parts of weight of calcium carbonate and/or calcium magnesium carbonate.

Especially in connection with the production of fire resistant material in the form of tape, the material comprises ethylene vinyl acetate.

In connection with the manufacturing of the fire resistant material in the form of pre-fabricated, moulded pipe elements the fire resistant material comprises a compound including generally an ethylene copolymer, and more specifically ethylene vinyl acetate.

From a technical production point of view, the fire resistant material comprises a plasticizer, a lubricating agent, and antioxidant agent.

Figure 3:
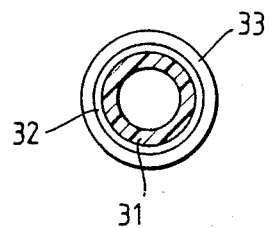
FIG. 3 is an end view of a pipe- or hose-shaped fire protected article in accordance with a further embodiment of the invention.
Figure 4:
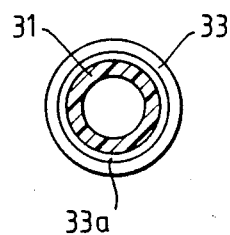
FIG. 4 is an end view of a pipe- or hose-shaped article insulated in accordance with yet another embodiment of the invention.
Figure 5:
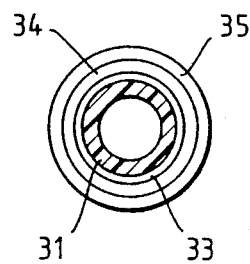
FIG. 5 is an end view of a pipe- or hose-shaped article insulated in accordance with a fifth embodiment of the invention.

As regards the protection of flexible pipes the embodiments illustrated in FIGS. 3, 4 and 5 can be used.

In FIG. 3 the reference numeral 31 designates an inner pipe or a hose which is made from plastic, for example nylon. It is to be understood that the inner pipe can of course be manufactured from other kinds of plastic, for example glass fiber reinforced epoxy or polyester.

Around the pipe 31 there is provided a layer of glass fiber 32, which has a good insulating property at relatively low temperature, i.e. in the area of approximately 100°–300° C. Outside the low temperature insulating layer 32 there is provided a fire resistant material 33, said fire resistant material having good heat conductivity at temperatures below approximately 200° C., whereas the material exhibits high heat and flame resistance at temperatures above for example 900° C.

In case a fire should occur the outer layer 33 will at first constitute a good heat conductor, whereas the inner insulating layer 32 will provide a heat barrier, which in turn will entail that the outer layer 33 will rapidly reach a high temperature which results in the material being converted to a cell-shaped, ceramic structure having superior flame retardent properties, up to 1500° C.

In FIG. 4 there is illustrated another embodiment of the invention, an inner pipe or an inner hose 31, for example of nylon, is surrounded by a first layer of insulating material, here foamed insulating material 33a of the above discussed type, which at higher temperatures, above approximately 300°–900° C. forms a fire resistant coating. The plastic/ceramic material 33a is foamed, it will have at a temperature of approximately 100°–300° C. a relatively low heat conductance capacity, such that it rapidly will form a heat barrier against the internal nylon hose 31, in case a fire should occur. Due to the foamed plastic/ceramic material 33a the outer insulating layer 33, which is a non-foamed plastic/ceramic mixture having good heat conducting properties below approximately 200° C. but a high fire resistant effect at temperatures above approximately 300°–900° C., will rapidly reach a temperature at which it is converted from its plastic-like consistency at lower temperatures, i.e. lower than approximately 90° C., via its swelling, water expelling condition in the range 90°–200° C. to thereafter rapidly be converted to its rigid cellular ceramic form at approximately 900° C., to form a heat resistant outer cellular cover.

The first insulating layer 33a may for example be foamed to provide a density of approximately 1, whereas the outer insulating layer 33 which is to be designated as non-foamed, can have a density of approximately 1.5–1.8. It is to be understood that the degree of foaming can vary within wide limits, and it is also to be understood that the foamed material 33a may have added thereto other fire insulating materials, for example glass fibers and the like.

In FIG. 5 there is illustrated a fifth embodiment of the invention, the inner nylon pipe 31 here being surrounded by a fire retardant plastic/ceramic material 33, said latter layer 33 having provided therearound a layer 34 of a material which is capable of absorbing the swelling which occurs in the plastic/ceramic layer 33 during a fire. The layer 34 may for example be an appropriate fabric or a woven glass fiber which has a filling percentage depending on the thickness of the plastic/ceramic compound 33 arranged internally thereof, which during a fire swells to approximately 2 times its original volume.

In order to achieve the above discussed effect with an inner barrier layer which provides good thermal protection also at lower temperatures of approximately 100°–300° C., a part of the plastic/ceramic material may be foamed, and then preferably in a layer which faces the inner hose 31.

Appropriately, the fire resistant plastic/ceramic material may also comprise 60–100 parts of weight of a thermo plastic material, 50–450 parts of weight of aluminum hydroxide and 150–600 parts of weight of calcium carbonate and/or calcium-magnesium carbonate.

Preferably there may be used an ethylene-vinylacetate copolymer, and due to production technical reasons the fire resistant material may comprise a plasticizing agent, a lubricating agent, a colouring agent and possibly an antioxidant agent.

As mentioned above the fire resistant material may be applied in a more or less foamed condition, the foamed qualities comprising glass fiber filaments and foaming agent of various quantities and qualities. The glass fiber filaments may for example be provided together with other glass materials, for example glass frit. The fire resistant material can comprise fatty acids and phosphate esters in suitable quantities.

Depending on the composition of the fire resistant material, and to which degree the material has been foamed, the conversion phase of the material during a fire can be varied within appropriate limits.

For example, the fire resistant material will, under the influence of temperatures higher than 90° C., be subjected to a softening process, whereas the material at temperatures exceeding 200° C. will be subjected to swelling, at the same time as water is repelled. At temperatures above 300° C. the polymer will be subjected to pyrolysis, and in the temperature range 300°–500° C. or 300°–600° C. organic residue materials will be developed.

When the temperature of the material exceeds 800°–900° C. there will be formed a relatively sturdy cellular ceramic, which will have fire retardant qualities up to 1500° C.

Thus, the material is a good thermal conductor in its original state, whereas at temperatures above 200° C., due to expelled water, it will form a good thermal insulation, while at the same time swelling to approximately 2 times its original size. In its cellular ceramic condition it renders good mechanical stability, the material also being a flame barrier without expelling poisonous smoke or gas.

Thus, the fire resistant material is converted from a thermoplastic material, in which the thermal conductivity at room temperature is approximately 0.7 w/mc, to a cellular ceramic having a thermal conductivity of approximately 0.07 w/mc.

I claim:

1. A bendable fire and corrosion protected hose for conducting corroding material, comprising:
    an inner bendable polymeric plastic pipe constituting a means to provide corrosion resistance to the hose from said corroding material;
    a layer of light, thermal insulating material covering said pipe and which normally cannot stand exposure to temperatures above about 800° C.; and
    a fire resistant material provided around said insulating material and which forms a ceramic, stable fire protecting phase at temperatures above about 800° C.;
    said insulating material and said fire resistant material permitting bending of said article.

2. An article according to claim 1, further including a further layer of fire resistant material between said inner plastic pipe and the light, thermal insulating material.

3. An article according to claim 1, further including an outermost layer of a metal foil as a radiation shield.

4. An article according to claim 1, wherein said fire resistant material is in the form of a tape.

5. An article according to claim 1, wherein said article is covered by a molded or extruded pipe element of the fire resistant material, said pipe element including a shell lined with a light weight insulation.

6. An article according to claim 1, further including an outer most layer of glass fiber tape.

7. An article according to claim 1, further including an outermost layer of steel net.

8. An article according to claim 1, further including an outer most ceiling and chemical resistant layer of foil.

9. An article according to claim 1, further including an outer most ceiling and chemical resistant layer of varnish.

10. A bendable fire and corrosion protected hose for conducting corroding material, comprising:
    an inner bendable polymeric plastic pipe constituting a means to provide corrosion resistance to the hose from said corroding material;
    a layer of light, thermal insulating material covering said pipe, and which has a low thermal conductance in a temperature range of about 100°–300° C.; and
    a second layer of fire resistant material provided around said layer of insulating material and which forms a stable ceramic fire protecting phase at temperatures of about 300°–900° C.;
    said insulating material and said fire resistant material permitting bending of said article.

11. An article according to claim 10, wherein said layer of thermal insulating material includes a glass fiber provided as a tape or woven cloth, and said second layer of fire resistant material has thermoplastic properties at room temperatures and forms a cellular ceramic phase having fire resisting properties at temperatures in the range of about 300°–900° C.

12. An article according to claim 10, wherein said layer of thermal insulating material is formed by a foamed fire resistant thermoplastic/ceramic material having a relatively low heat conductance at temperatures in the range of 100°–300° C. and which forms a stable ceramic fire protecting phase at temperatures above about 800° C., and said second layer of fire resistant material has a low thermal insulation at room temperatures and which forms a stable ceramic fire protecting phase at temperatures above about 800° C.

13. An article according to claim 12, wherein said layer of insulating material has a density of approximately 1.0 and said second layer of fire resistant material has a density of about 1.5.

14. An article according to claim 10, further including a resilient material in covering relation to the layer of fire resistant material and a substantially non-elastic armour in covering relation to said resilient material.

15. An article according to claim 14, wherein said resilient material and said thermal insulating material are made of a fabric.

16. An article according to claim 14, wherein said resilient material and said thermal insulating material are made from glass.

17. An article according to claim 14, wherein said resilient material and said thermal insulating material are made from fiber.

* * * * *